United States Patent

Choe et al.

[11] Patent Number: 4,717,407
[45] Date of Patent: Jan. 5, 1988

[54] PROCESS FOR RECOVERING HELIUM FROM A MULTI-COMPONENT GAS STREAM

[75] Inventors: Jung S. Choe; Rakesh Agrawal, both of Allentown; Steven R. Auvil, Macungie, all of Pa.

[73] Assignee: Air Products and Chemicals, Inc., Allentown, Pa.

[21] Appl. No.: 874,745

[22] Filed: Jun. 16, 1986

Related U.S. Application Data

[63] Continuation-in-part of Ser. No. 759,027, Jul. 25, 1985, Pat. No. 4,654,063, which is a continuation-in-part of Ser. No. 684,655, Dec. 21, 1984, Pat. No. 4,595,405.

[51] Int. Cl.⁴ .................................................. F25J 3/00
[52] U.S. Cl. ........................................... 62/18; 55/68; 55/158; 62/20; 210/500.21
[58] Field of Search ................... 62/17, 18, 20; 55/68, 55/158; 210/500.21

[56] References Cited

U.S. PATENT DOCUMENTS

| | | | |
|---|---|---|---|
| 3,250,080 | 5/1966 | Garwin | 62/24 |
| 3,324,626 | 6/1967 | Dresser et al. | 55/16 |
| 3,377,812 | 4/1968 | Garrett et al. | 62/18 |
| 4,192,661 | 3/1980 | Johnson | 62/18 |

*Primary Examiner*—Ronald C. Capossela
*Attorney, Agent, or Firm*—Mark L. Rodgers; William F. Marsh; James C. Simmons

[57] ABSTRACT

The present invention involves an efficient process for recovering helium from a gas mixture containing helium and at least one other component. Separation is effected by integrating a semi-permeable membrane-based unit with a non-membrane type separation unit.

22 Claims, 4 Drawing Figures

PROCESS FOR RECOVERING HELIUM FROM A MULTI-COMPONENT GAS STREAM

CROSS-REFERENCE TO PARENT APPLICATION

This is a continuation-in-part of U.S. patent application Ser. No. 759,027, filed July 25, 1985, now U.S. Pat. No. 4,654,063, which is a continuation-in-part of U.S. patent application Ser. No. 684,655, now U.S. Pat. No. 4,595,405, filed Dec. 21, 1984, the subject matter of both which are hereby incorporated by reference.

TECHNICAL FIELD

The present invention relates to the recovery of helium from a gas mixture containing helium and at least one other component.

BACKGROUND OF THE INVENTION

A variety of processes and techniques have been developed to separate and recover helium from multi-component gas streams.

Such processes include stand-alone membrane units, stand-alone cryogenic units and combinations of membrane units, cryogenic units and pressure swing adsorption (PSA) units. Stand-alone cryogenic processes have been used to produce crude helium at high recovery from natural gas or other streams containing low purity helium. When the concentration of helium in the feed drops to low levels; e.g., below about 1%, processes using stand-alone cryogenic units become inefficient and impractical.

Processes utilizing stand-alone semi-permeable membrane units have the disadvantage in that the helium is subjected to considerable pressure loss when permeating through the membrane making the system energetically unfavorable, especially since the helium product is generally needed at high pressure. Additionally, in order to achieve high helium recoveries and/or purities, staging several membrane units is required, thereby greatly increasing the energy requirements.

U.S. Pat. No. 3,250,080 discloses a process for fractionating a gas mixture containing first and second components having different diffusion rates. The gas mixture is passed through a series of diffusion cells having high and low pressure sides separated by semi-permeable membranes. A product stream of diffused gas enriched in the more diffusible component is withdrawn from the low pressure side, and similarly residual gas enriched in the less diffusible component is withdrawn from the high pressure side in the series. A portion of the diffused gas product may be subjected to low temperature liquefaction and fractionation to obtain a fraction further enriched in the desired component of the gaseous mixture.

U.S. Pat. No. 3,324,626 discloses a process for recovering helium from a gaseous mixture containing less than about 25% helium. The process involves passing the helium-containing gaseous mixture through a permeation stage comprising a high pressure side and a low pressure side separated by a thin, non-porous film having selective permeability for helium. The permeate helium stream is subsequently compressed and cooled to liquefy and separate non-helium constituents.

BRIEF SUMMARY OF THE INVENTION

The present invention provides an efficient process for the recovery of helium from a feed gas mixture comprising helium and at least one other component. This process comprises treating the feed gas mixture in a non-membrane separation unit, such as a cryogenic processing unit, and subsequently withdrawing at least a portion of the treated gas stream from said processing unit and introducing said portion into a membrane separation unit. In the membrane separation unit, the gas stream is separated to form a helium-rich stream and a helium-lean stream. The helium-rich stream is collected as usable product or passed to an additional treatment zone for further purification. The helium-lean stream is returned to the non-membrane separation unit for further treatment and separation. The non-membrane unit can optionally produce a stream sufficiently rich in helium so that it can be combined with the helium-rich stream from the membrane unit to form a combined helium-rich product stream.

If the initial feed gas mixture is sufficiently rich in helium, said feed mixture may initially be passed through a membrane unit to separate out a portion of the helium, as a helium-rich stream, prior to introducing the feed gas mixture into the non-membrane separation unit.

Incorporating one or more membrane units into a non-membrane processing unit at some point, or points, improves the efficiency and can thereby improve the economics of the system. Specifically, incorporating a membrane separation unit allows a given non-membrane separation unit to be operated efficiently at conditions that might be inefficient when operated on a stand-alone basis. Consequently, separation techniques that were considered inefficient in the past may, when properly coupled with a membrane system, yield superior and feasible processes. This is due in part to the fact that, in the integrated system, use of the membrane provides an additional degree of freedom to adjust the process parameters for further optimization. By proper integration of the membrane and the non-membrane separation units, each of the units operate in their favorable range of operation. In the present process arrangement, both the membrane and the non-membrane separation units complement each others operation to yield a highly efficient process which could not be achieved with separate stand-alone processes. For example, the advantages of the integrated process over typical stand-alone processes may include: significantly higher helium recovery at a given helium purity, a reduction in the number and size of the equipment needed for the non-membrane separation unit, and a significant power savings in the overall operation of the system.

DETAILED DESCRIPTION OF THE INVENTION

The present invention provides for an efficient process for recovering helium from a gas stream containing helium and at least one other component, by the integration of one or more membrane units with a suitable non-membrane separation unit. This process can be used for recovering helium from such diverse streams as natural gas, a slip stream from a nitrogen rejection unit (NRU) 19 in FIG. 1, liquid natural gas (LNG), crude helium gas, pipeline gas, etc. The pressure of these streams may vary from atmospheric to that in excess of 3,000 psia, while the concentration of helium may range from 0.1-90 mole %. The process of the present invention can be operated to provide an energy efficient process for recovering high purity helium; i.e., greater than 70 mole %, and preferably greater than 95 mole %, and/or crude helium; i.e., between 40-70 mole %.

Figure 1:
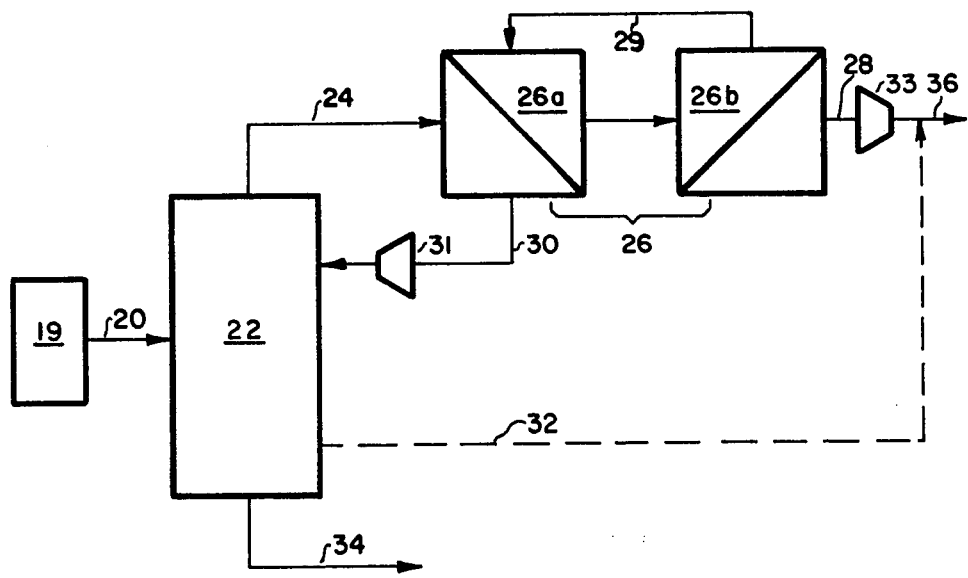
FIG. 1 is a schematic diagram of a process according to the present invention for the production of a helium-rich product.

A general description of the process for the recovery of a helium-rich stream can be had by reference to FIG. 1. A helium-containing gaseous feed mixture 20 is fed to a suitable non-membrane separation unit 22, for treatment and separation to produce a helium-enriched stream and a helium-depleted stream. The non-membrane separation unit 22 can be an adsorption, absorption, cooling, or partial condensation and/or rectification type unit. At least a portion of the helium-enriched stream is withdrawn from the non-membrane separation unit 22 as gaseous stream 24, and is introduced to a membrane unit 26, represented here as a cascade of membranes 26a and 26b with an internal recycle stream 29, wherein said helium-enriched stream is separated to form a helium-rich permeate stream 28 and a helium-lean reject stream 30. The helium-lean reject stream 30, is optionally compressed in compressor 31, and is recycled to the non-membrane separation unit 22 for further treatment and separation to form a helium-enriched stream and a helium-depleted stream. The helium-depleted stream separated from the feed stream 20 is combined with the helium-depleted stream separated from the helium-lean stream 30 from the membrane unit 26 and the combined stream is recovered as product stream 34. Product stream 34 comprises mainly the non-helium components contained in the initial feed stream 20. For example, if helium is to be separated from nitrogen and methane, the helium-deficient stream 34 will comprise a stream rich in nitrogen and methane. Optionally, helium-deficient stream 34 may represent more than one stream if the individual components of the helium-deficient stream are also separated in the non-membrane separation unit 22. Any or all of the helium-deficient stream 34 can be recovered as a product stream or simply be discarded as a waste stream. The non-membrane unit 22 can optionally produce a helium-rich stream 32 which can be combined with the helium-rich permeate stream 28 to form a single helium-rich product stream 36. Prior to being combined with helium-rich stream 32, the helium-rich permeate stream 28 may need to be compressed in compressor 33 to a pressure about equal to the pressure of the helium-rich stream 32.

Figure 2:
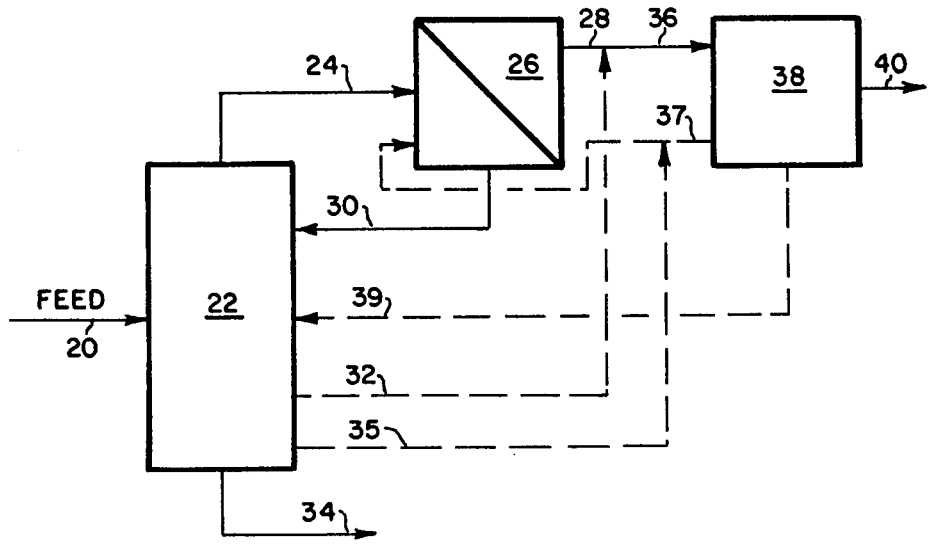
FIG. 2 is a schematic diagram of a process according to the present invention for the production of high purity helium.

As shown in FIG. 2, if a highly purified helium stream is desired; i.e., a helium concentration above about 95 mole %, the helium-rich permeate stream 28 from the membrane separation unit 26, is fed to a second non-membrane unit 38, such as a PSA unit for further separation. The second non-membrane separation unit 38 removes the non-helium components thereby producing a purified helium stream 40. If a separate helium-rich stream 32 is produced from the first non-membrane unit 22, it is combined with the helium-rich stream 28 from the membrane unit to form helium-rich stream 36 before it is fed to the second non-membrane unit 38. The purge from the second non-membrane unit 38 containing non-helium components along with some helium can be recycled to the membrane unit 26 as purge stream 37 or to the first non-membrane unit 22 as purge stream 39, depending upon the helium concentration, temperature, and pressure. Additionally, if a second non-membrane unit 38 is employed with a purge 37 returning to the membrane unit 26, a helium-rich stream 35 may optionally be withdrawn from the first non-membrane unit 22 and combined with purge stream 37 for further separation.

In addition to a second non-membrane separation unit 38, any system required to remove low level contaminants; e.g., $H_2$, $CO_2$, $H_2O$, etc., from the feed, intermediate streams, or helium product streams may be added to the process cycle.

Figure 3:
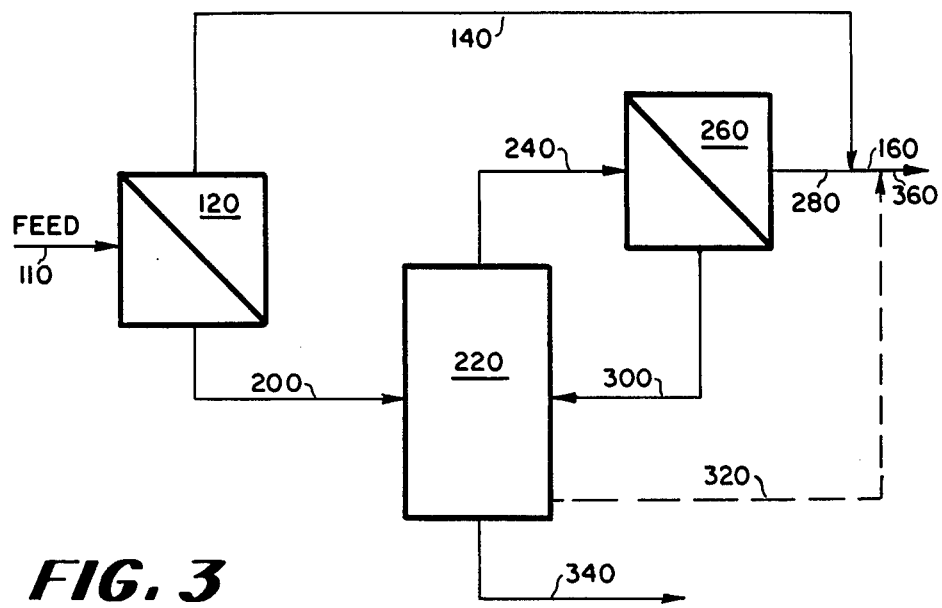
FIG. 3 is a schematic diagram of a process according to the present invention having two membrane separation units.

In some instances, the gaseous feed mixture may have a sufficient helium concentration; typically at least about 25%; to undergo initial separation in a membrane unit prior to being passed through the non-membrane separation unit. A general representation of such an embodiment is shown in FIG. 3. In this case, a gaseous feed mixture 110, having a relatively high concentration of helium, is initially passed to a membrane unit 120, where it is separated to form a first helium-rich permeate stream 140 and a reject gas stream 200. The reject gas stream 200 containing some helium, is introduced into a non-membrane separation unit 220, where it undergoes treatment and separation to produce a helium-enriched stream and a helium-depleted stream. At least a portion of the helium-enriched stream produced in the non-membrane separation unit 220, is withdrawn as stream 240 and introduced into a second membrane unit 260. The second membrane unit 260, separates the helium-enriched stream into a second helium-rich permeate stream 280 and helium-lean reject stream 300. The second helium-rich permeate stream 280 is combined with the first helium-rich permeate stream 140 to form a combined helium-rich product stream 160. The helium-lean reject stream 300 is returned to the non-membrane separation unit 220 for further treatment and separation to produce a helium-depleted stream. The non-membrane unit 220 can optionally produce a third helium-rich stream 320. The combined helium-rich stream 160 may need to be compressed to a pressure about equal to that of the third crude helium stream 320 and the streams are combined to form a final helium product stream 360. The helium-depleted stream separated from the reject gas stream 200 passed to the non-membrane separation unit, is combined with the helium depleted stream separated from the helium-lean reject stream 300 from the second membrane unit 260 and recovered as a product or waste stream 340.

Figure 4:
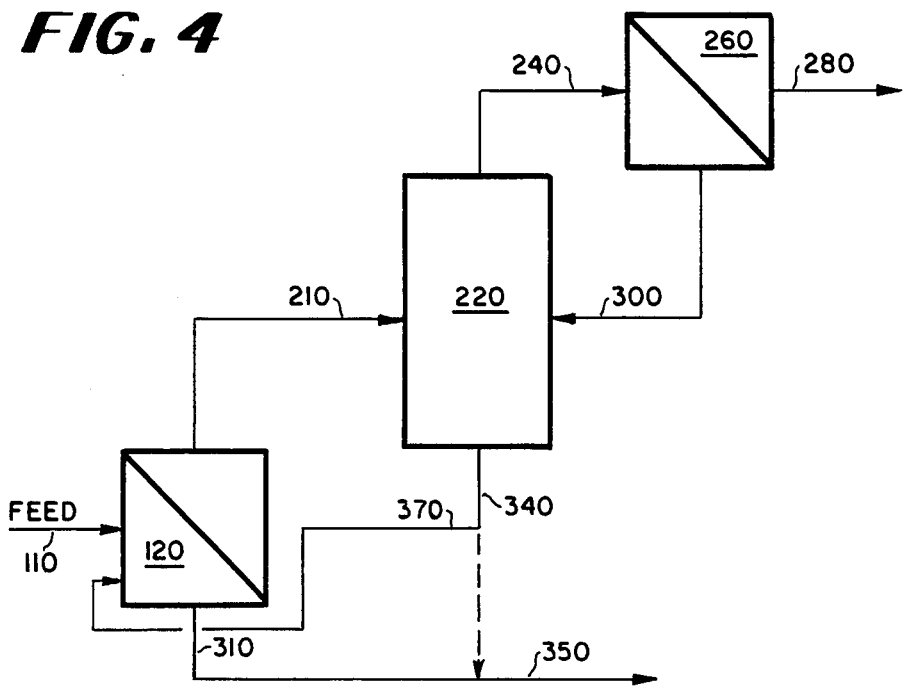
FIG. 4 is a schematic diagram of a different embodiment of the present invention having two membrane separation units.

FIG. 4 shows a process scheme for recovering helium from a gaseous feed mixture containing low levels of helium; i.e., between 0.1-5.0 mole % and particularly between 0.1-2.0 mole %. This is especially beneficial in applications where the processed gas has to be returned at a pressure near that of the feed; for example, the recovery of helium from a pipeline gas whose helium content is low as specified above, and the processed gas must be returned to the pipeline at a pressure near its original value. In this process scheme, the gaseous feed mixture 110, having a low helium concentration, is first processed in a first membrane unit 120 to produce a helium deficient reject stream 310 and a permeate stream 210 which is sufficiently rich in helium so that it can be fed to a non-membrane device 220 for further processing, in accordance with the flow schemes set out in FIGS. 1, 2 and 3.

Depending on the helium level of the helium-deficient stream 340 leaving the non-membrane device, this stream can be recycled as stream 370 to the first membrane unit 120 for further processing if enough helium is present, or alternatively it can be discarded or combined with the reject stream 310 and returned to the original source as stream 350.

This process scheme allows a substantial portion of the helium in the gaseous feed mixture 110 to be recovered without a significant reduction in the pressure relative to the feed stream. Additionally, an advantage is realized in that the equipment sizes needed in the hybrid scheme to further process the permeate stream 210 are substantially reduced.

The membrane separation unit used in this invention can be any membrane device with some selectivity for separating helium from the other components in the feed when a pressure differential is maintained across the membrane. Typically, the helium permeability through the membrane is greater than that of the other components present in the feed to the membrane. Consequently, the concentration of helium in the reject stream from the membrane separation unit is less than its concentration in the feed stream entering the membrane. Generally, the pressure of this helium-lean reject stream is within a few psi of the feed stream to the membrane unit and, as shown in the accompanying Figures, is fed to the non-membrane separation unit, A higher permeability of helium and/or its selectivity through the membrane is desirable and results in a beneficial effect on the performance of the overall system. Alternately, the membrane unit may produce a helium-rich reject stream and a permeate stream lean in helium. In such cases, the helium-lean permeate stream would be recycled to the non-membrane separation unit and the helium-rich reject stream would constitute the product.

The membrane separation unit or units may consist of a single membrane device or, alternatively, several membrane devices plumbed and operated so as to achieve the separation in the most efficient manner; e.g., a cascade of membranes with internal recycle streams between various stages of the membrane unit. Typically, the membrane devices are manufactured in modules, each having certain semi-permeable membrane areas for permeation. As a result, the process schemes shown in FIGS. 3 and 4 which depict two distinct and separate membrane units, 120 and 260, could alternately employ a single unit having several semi-permeable membrane modules with the various feed streams entering the unit at different locations, depending upon the composition, pressure, etc. For example, if the concentration of helium in the helium-enriched stream 240 is less than the gaseous feed mixture 110, the gaseous feed mixture 110 can be fed to the first membrane module, and the helium-enriched stream 240 can be mixed with the reject stream from either the first module or any suitable subsequent module to provide a mixed feed to the next module. The reject stream with which the helium-enriched stream 240 is mixed is chosen such that the helium concentration of both streams is approximately equal. The reject from the final module forms the feed to the non-membrane unit 220. Alternatively, if the concentration of the helium in helium-enriched stream 240 is higher than the gaseous feed mixture 110, it is fed to the first membrane module, and the gaseous feed mixture 110 is mixed with the reject stream from a suitable intermediate module to form a combined feed to the next module.

Other variations of the process schemes depicted in the Figures are possible depending upon the concentrations of the various streams. For example, in FIG. 3, if the concentration of helium in the helium-enriched stream 240 is less than the gaseous feed mixture 110, the gaseous feed mixture 110 is fed to the membrane unit 120 and a separation is achieved such that the concentration of helium in the reject stream 200 is approximately equal to its concentration in stream 240. The two streams, 200 and 240, are then mixed to form a combined feed to membrane unit 260. The reject stream 300 from this unit forms the feed to the non-membrane unit 220. Alternatively, if the concentration of helium in the helium-enriched stream 240 is higher than the gaseous feed mixture 110, the reject stream 300 from the membrane unit 260 is mixed with gaseous feed mixture 110 and the combined stream is fed to the membrane unit 120. The reject stream 200 from the membrane unit 120 then forms the feed to the non-membrane unit 220.

In all of the above process schemes, optional compressors or expanders may be utilized to vary the pressure of any of the gas streams, depending upon the gas mixture, treatment pressures, and pressure difference between any two streams which are subsequently combined. For example, in FIG. 1, stream 24 from the non-membrane separation unit 22 can be pressurized prior to being fed to the membrane separation unit 26. Additionally, vacuum pumps may be used to achieve sub-atmospheric pressure on the permeate side of one or more of the membranes in order to increase diffusion rates of the desired gas across the membrane.

It should be understood that any required pretreatment of the gaseous feed mixture to the integrated process, or post-treatment of any of the product streams from the integrated process can be employed with this invention. For example, depending upon the choice of the non-membrane process, a pretreatment to remove certain components from the gaseous feed mixture which can have adverse effect on the operation of the integrated process may be required. Similarly, it is possible to have components in the final helium product which may be undesirable in the subsequent use of this product stream and must be removed in a post-treatment operation prior to its use.

Although the Figures show only one stream leaving the non-membrane separation units and serving as a feed to a single membrane separation unit, in practice one or more streams can be taken from the non-membrane unit and fed to one or more membrane units. The number of streams taken from the non-membrane separation unit, as well as the composition, pressure, and temperature of the streams is dependent upon the type of non-membrane separation unit used, and is adjusted so that the performance of the total plant is at its most optimal point.

Since only a marginal pressure drop is experienced between the feed stream to the membrane unit and the reject stream leaving the membrane unit, the feed to the non-membrane unit remains at a fairly high pressure. Additionally, all of the helium product does not have to be produced from the non-membrane unit which allows the unit to be run under optimum conditions. For example, if the non-membrane separation unit is a cryogenic unit, the partial pressures of the condensibles in the feed to the cryogenic unit are kept at high values so that a significant fraction of these can be condensed at much warmer temperatures. Therefore, if the concentration of these condensibles in the feed to the integrated plant is low, it is first fed to a membrane unit to produce a reject stream which is lean in helium, but has higher partial pressures of condensibles. The reject stream having a high condensibles partial pressure is then fed to the cryogenic unit. Moreover, all the feed to the cryogenic unit is not cooled to very low temperatures to produce a product of high purity, but a significant fraction, or all of it, is cooled sufficiently to give a gaseous stream with a relatively higher concentration of undesired components. This stream is then sent to another membrane unit to give a permeate product stream. By avoiding extremely low temperatures in the cryogenic unit, the demand for refrigeration is decreased and it operates its optimum. The reject stream from the membrane which again has higher partial pressures of the condensibles is recycled back to the cryogenic unit for further processing.

A wide range of process conditions, including temperatures, pressures, flow rates, etc., can be employed in the present integrated non-membrane/membrane process, to achieve optimum results, depending upon the equipment used and the desired type and concentration of product. The examples below illustrate several of these various process schemes. These examples are meant only to be illustrative and are not meant to limit the scope of the invention.

EXAMPLE 1

The objective of this example is to produce a helium stream having a helium concentration of greater than 99 mole %; i.e., Grade A helium, at 2700 psia from a natural gas mixture containing 2.1% helium at 465 psia. The feed composition was taken from the March 1961 issue of the *Petroleum Refiner*, page 205, and is represented as the average gas composition during 1959 to 1960 at the Keyes helium recovery plant built by the U.S. Bureau of Mines in Oklahoma.

The feed gas properties are set out in Table 1 below.

TABLE 1

Feed Gas Properties for Examples 1 and 2

| | |
|---|---|
| Feed Rate = | 10,000 lb moles/hr |
| Pressure = | 465 psia |
| Temperature = | 100° F. |

| Composition: | |
|---|---|
| Component | Mole % |
| Helium | 2.1 |
| Nitrogen | 26.2 |
| Methane | 64.2 |
| Ethane | 3.1 |
| Propane | 1.9 |
| Butane | 1.0 |
| Pentane | 0.4 |
| Hexane | 0.2 |
| Argon | 0.1 |
| Carbon Dioxide | 0.8 |

Run 1

Process calculations were run for the above feed to produce the desired helium product in accordance with the present invention as shown in FIG. 2. The first non-membrane separation unit 22 is a cryogenic-type unit and the second non-membrane unit 38 is a PSA unit. In the present calculations, a cascade of membrane units was used, although with improved membranes and/or different stream conditions, it may be possible to use only a single stage membrane unit.

The helium product leaving the PSA unit, Stream 40, has a helium concentration of greater than 99.99 mole % at a pressure of about 600 psia. The helium is then compressed to a final product pressure of about 2700 psia. The purge stream 37 from the PSA unit 38 was recycled to a suitable stage of the membrane cascade 28.

The process conditions and mass balance for key process streams for this run are set out in Table 2 below.

TABLE 2

| Stream Number | 20 | 34 | 24 | 37 | 28 | 40 |
|---|---|---|---|---|---|---|
| Pressure (psia) | 465 | 193 | 180 | 65 | 95 | 600 |
| Temperature (°F.) | 100 | 88 | 100 | 100 | 97 | 100 |
| Total Flow (lb m/hr) | 10,000 | 9,802 | 711 | 98 | 295 | 193 |
| Composition (mole %) | | | | | | |
| Helium | 2.1 | 0.12 | 27.26 | 85.71 | 95.06 | 99.99% |
| Nitrogen | 26.2 | 26.76 | 60.12 | 14.28 | 4.15 | — |
| Methane | 64.2 | 65.47 | 12.50 | 0.01 | 0.79 | — |
| Ethane | 3.1 | 3.16 | 0.01 | — | — | — |
| Propane | 1.9 | 1.94 | — | — | — | — |
| Butane | 1.0 | 1.02 | — | — | — | — |
| Pentane | 0.4 | 0.41 | — | — | — | — |
| Hexane | 0.2 | 0.20 | — | — | — | — |
| Argon | 0.1 | 0.10 | 0.09 | — | 0.03 | — |
| Carbon Dioxide | 0.8 | 0.82 | 0.01 | — | 0.03 | — |

Run 2 (Comparative)

Calculations were run on the feed stream set out in Table 1 above to produce the desired helium product using a cryogenic unit coupled with a PSA unit. The cryogenic scheme chosen for this run is about identical to that of the hybrid scheme presented in Run 1 in order to give an equivalent comparison between the two processes. The only difference for this cryogenic/PSA unit is the use of a rectifying column for further purification and the use of external cooling provided via liquid nitrogen.

A comparison of the total helium recovery and total power consumption between this process, Run 2, and the process of the present invention, Run 1, is set out in Table 3 below.

Run 3 (Comparative)

Calculations were run on the feed stream set out in Table 1 above to produce the desired helium product using a membrane unit coupled with a PSA unit. A cascade of three membrane stages was used in order to produce a 95 mole % helium permeate stream at the desired recovery. The permeate stream from the third membrane stage is compressed and sent to a PSA unit for Grade A helium production.

In general, this scheme suffers from the fact that it is very difficult to gain any additional helium recovery once it reaches a 90+% level. Both power and membrane area requirements increase by 20+% for an additional 3.3% helium recovery.

A comparison of the total helium recovery and total power consumption between this scheme, Run 3, and the process of the present invention, Run 1, is set out in Table 3 below.

TABLE 3

Grade A Helium Recovery and Power Consumption
for All the Runs of Example 1
Final Product Pressure = 2700 psia

| Run | 1 | 2 | 3 |
|---|---|---|---|
| Helium Recovery (%) | 95 | 90 | 91 |
| Power (KW): | | | |
| Compressors in the Cryogenic Section | — | 260 | — |
| Compressors in the Membrane Section | 1,329 | — | 4,429 |
| Expander | — | — | (1,388) |
| External Refrigeration Via Liquid Nitrogen | — | 2,294 | — |
| product Compressor | 134 | 134 | 134 |
| Total (KW) | 1,463 | 2,698 | 3,041 |

As shown in Table 3 above, the process of the present invention has a higher helium recovery at the desired product purity and pressure than either of the other two process schemes. Additionally, the present invention utilizes over 45% less power than the cryogenic/PSA system and over 51% less power than the membrane/PSA system to produce the desired helium product.

EXAMPLE 2

Calculations were also done to produce a crude helium stream containing 54 mole % helium at 500 psia using the feed stream shown in Table 1 above. In industry, crude helium is either sold to customers or stored for later use. Calculations based on the present invention, Run 4, and two comparative schemes, Runs 5 and 6 were carried out as described below.

Run 4

The hybrid cryogenic/membrane process depicted in FIG. 1 was used to simulate this case. A second non-membrane unit, e.g. a PSA unit, is not needed since only a medium purity product is desired. The permeate stream from the membrane unit 26 is the helium product stream which is compressed to 500 psia as desired.

The process conditions and mass balance for key streams for this run are set out in Table 4 below.

TABLE 4

| Stream Number | 20 | 34 | 24 | 28 |
|---|---|---|---|---|
| Pressure (psia) | 465 | 193 | 180 | 65 |
| Temperature (°F.) | 100 | 88 | 100 | 98 |
| Total Flow (lb m/hr) | 10,000 | 9,802 | 771 | 539 |
| Composition (mole %) | | | | |
| Helium | 2.1 | 0.12 | 27.26 | 54.06 |
| Nitrogen | 26.2 | 26.76 | 60.12 | 38.08 |
| Methane | 64.2 | 65.47 | 12.50 | 7.70 |
| Ethane | 3.1 | 3.16 | 0.01 | — |
| Propane | 1.9 | 1.94 | — | — |
| Butane | 1.0 | 1.02 | — | — |
| Pentane | 0.4 | 0.41 | — | — |
| Hexane | 0.2 | 0.20 | — | — |
| Argon | 0.1 | 0.10 | 0.09 | 0.13 |
| Carbon Dioxide | 0.8 | 0.82 | 0.01 | 0.03 |

Run 5 (Comparative)

Calculations were run to produce the desired crude helium product using a stand-alone cryogenic unit. A similar cryogenic system was used for this run as was used in Example 1, Run 2.

A comparison of the total helium recovery and total power consumption between this process, Run 5, and the process of the present invention, Run 4, is set out in Table 5 below.

Run 6 (Comparative)

Calculations were made to produce the desired crude helium product using a stand-alone membrane unit. A cascade of two membrane stages was used for the calculations. It was assumed that a system to remove $CO_2$ would be placed at some point in the system. As was the case in Example 1, Run 3, significantly higher membrane areas and power are required for relatively small increases in helium recovery.

A comparison of the total helium recovery and total power consumption between this scheme, Run 6, and the process of the present invention, Run 4, is set out in Table 5 below.

TABLE 5

Crude Helium Recovery and Power Consumption
for All Cases of Example 2
Final Product Pressure = 500 psia

| Run | 4 | 5 | 6 |
|---|---|---|---|
| Helium Recovery (%) | 95 | 92 | 91.5 |
| Power (KW): | | | |
| Compressors in the Membrane Section | 336 | — | 2,942 |
| Expander | — | — | (1,364) |
| External Refrigeration Via Liquid Nitrogen | — | 1,200 | — |
| Product Compressor | 382 | 141 | 641 |
| Total (KW) | 718 | 1,341 | 2,219 |

As shown in Table 5 above, the process of the present invention has a higher helium recovery at the desired product pressure and purity than either of the stand-alone processes. Additionally, the present invention utilizes over 46% less power than the stand-alone cryogenic system, and over 67% less power than the stand-alone membrane system to produce the desired helium product.

Having thus described the present invention what is now deemed appropriate for Letters Patent is set out in the following appended claims.

What is claimed is:

1. A process for recovering helium from a feed gas mixture comprising helium and at least one other component, said process comprising providing an additional degree of freedom for adjusting the process parameters by:
    (a) treating said feed gas mixture in a non-membrane separation unit to produce a helium-enriched stream and a helium-depleted stream;
    (b) withdrawing at least a portion of the helium-enriched stream from the non-membrane separation unit;
    (c) feeding said portion of said helium-enriched stream to a membrane separation unit, wherein said helium-enriched stream is separated to form a helium-rich stream and a helium-lean stream;
    (d) recycling the helium-lean stream to the non-membrane separation unit for further treatment and separation to produce a helium-depleted stream; and
    (e) recovering the helium-rich stream from the membrane separation unit.

2. The process in accordance with claim 1 wherein the helium depleted stream produced in step (a) is combined with the helium-depleted stream produced in step (d) and subsequently recovered as product.

3. The process in accordance with claim 1 wherein the helium-rich stream from the membrane unit is the permeate stream and the helium-lean stream is the reject stream.

4. The process in accordance with claim 1 wherein a helium-rich stream is produced in the non-membrane separation unit and is combined with the helium-rich stream from the membrane unit to form a combined helium product stream.

5. The process in accordance with claim 1, wherein said nonmembrane separation unit is a cryogenic-type separation unit.

6. The process in accordance with claim 1 wherein the helium-lean stream from the membrane unit is passed through a compressor prior to being returned to the non-membrane separation unit.

7. The process in accordance with claim 1 wherein the membrane separation unit comprises a cascade of membranes with internal recycle streams between various stages of the membrane unit.

8. The process in accordance with claim 4 wherein the helium-rich stream from the membrane unit is passed through a compressor prior to being combined with the second helium-rich stream produced in the nonmembrane separation unit.

9. The process in accordance with claim 1 wherein the feed gas mixture is selected from the group consisting of: natural gas, a slip stream from a nitrogen rejection unit, liquid natural gas, crude helium gas and pipeline gas.

10. The process in accordance with claim 1 wherein the feed gas mixture is passed through a membrane separation unit to remove a portion of the helium as a helium-rich product stream prior to being treated in the non-membrane separation unit.

11. The process in accordance with claim 10 wherein the feed gas mixture has a helium concentration of at least 25 mole %.

12. The process in accordance with claim 1 wherein the feed gas mixture is passed through a first membrane separation unit to remove a portion of the non-helium components prior to being treated in the non-membrane separation unit.

13. The process in accordance with claim 12 wherein the helium-depleted stream from the non-membrane unit is recycled back to the first membrane separation unit.

14. The process in accordance with claim 13 wherein the feed gas mixture has a helium concentration of less than 5.0 mole %.

15. The process in accordance with claim 1 wherein the helium-rich stream from the membrane separation unit is passed to a second non-membrane separation unit for further purification.

16. The process in accordance with claim 15 wherein said second non-membrane separation unit is a PSA unit.

17. A process for recovering helium from a feed gas mixture comprising helium and at least one other component, said process comprising providing an additional degree of freedom for adjusting the process parameters by:
(a) passing said feed gas mixture through a first membrane separation unit to form a first helium-rich stream and a first helium-lean stream;
(b) treating said helium-lean stream in a non-membrane separation unit to produce a helium-enriched stream and a helium-depleted stream;
(c) withdrawing at least a portion of the helium-enriched stream from the non-membrane separation unit;
(d) feeding said portion of said helium-enriched stream to a second membrane unit wherein said helium-enriched stream is separated to form a second helium-rich stream and a second helium-lean stream;
(e) recycling the second helium-lean stream to the non-membrane separation unit for further treatment and separation to produce a helium-depleted stream; and
(f) recovering both helium-rich streams.

18. The process in accordance with claim 17 wherein the helium-depleted stream produced in step (b) is combined with the helium-depleted stream produced in step (e) and subsequently recovered as product.

19. The process in accordance with claim 17 wherein said nonmembrane separation unit is a cryogenic-type separation unit.

20. The process in accordance with claim 17 wherein a third helium-rich stream is produced in the non-membrane separation unit and is combined with both of the helium-rich streams from the membrane separation units to form a combined helium-rich product stream.

21. The process in accordance with claim 17 wherein the first and second membrane units are part of a single membrane separation unit with the feed gas and the portion of the helium-enriched gas stream from the non-membrane separation entering the single membrane unit at different locations along the unit.

22. The process in accordance with claim 17 wherein the helium-rich streams from the membrane units are permeate streams and the helium-lean streams are reject streams.

* * * * *